(No Model.)
P. STARK.
MOTOR.
No. 573,366.   Patented Dec. 15, 1896.
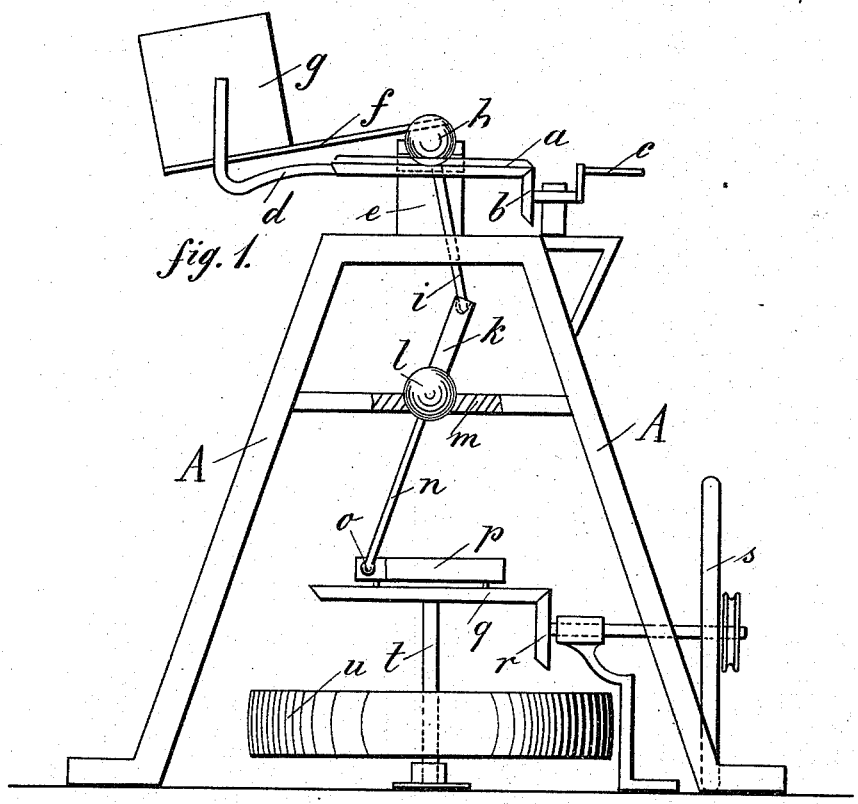
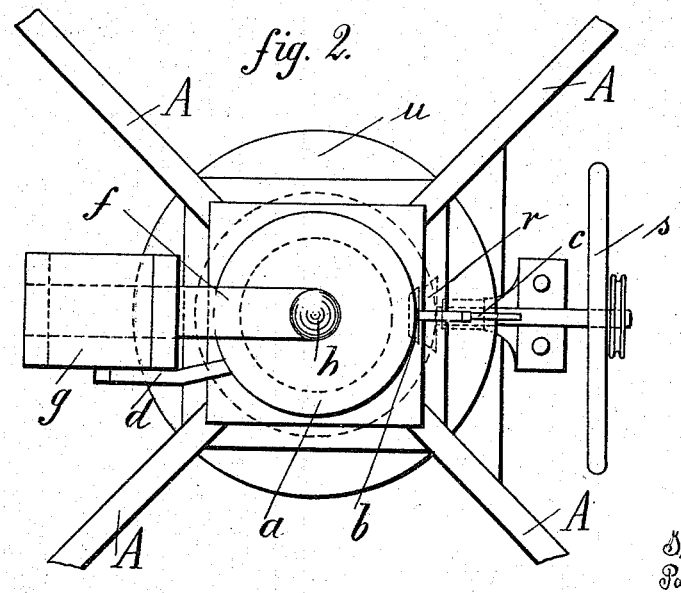
Witnesses:
P. Roediger
E. Mietschke
Inventor
Paul Stark
by:
W. Bantz
Attorney

UNITED STATES PATENT OFFICE.

PAUL STARK, OF MARKNEUKIRCHEN, GERMANY.

MOTOR.

SPECIFICATION forming part of Letters Patent No. 573,366, dated December 15, 1896.

Application filed January 23, 1895. Serial No. 535,968. (No model.)

*To all whom it may concern:*

Be it known that I, PAUL STARK, a subject of the King of Saxony, and a resident of Markneukirchen, in the Kingdom of Saxony, German Empire, have invented a certain new and useful Improved Motor, of which the following is a full, clear, and exact description.

The present invention consists of a motor in which the power is derived from an eccentrically-arranged rotary weighted body, as hereinafter more particularly described; and in order to make the present invention more easily intelligible reference is had to the accompanying drawings, in which similar letters of reference denote similar parts throughout both views.

Figure 1 is a side elevation of the motor, and Fig. 2 a plan view of the same.

To the top of the stand A is attached a bearing $e$, having a suitably-formed bearing-surface for a ball $h$, beneath which a bevel-wheel pair $a\ b$ is mounted to rotate by means of the crank-handle $c$. To the ball $h$ is rigidly attached an arm $f$, at the free end of which a weight $g$ is fixed, and to the bevel $a$ is rigidly attached an arm $d$, which rests against said weight and when the bevel rotates causes the weight $g$ to revolve. The arm $f$ slants downwardly toward its weighted end, and at the lower part of the ball $h$ is rigidly attached a downwardly-extending arm $i$, connected by means of a loose ball-joint to the upper part $k$ of an arm $k\ n$, at about the middle of which is fixed a ball $l$, mounted in suitable bearings $m$ of the frame A. The lower part $n$ of this rod is again connected by means of a ball-joint to a disk $p$, rigidly attached to a bevel $q$, gearing with a second bevel $r$, mounted on a horizontal shaft carrying at its farther end the pulley $s$. To the vertical shaft $t$, on which is mounted the bevel $q$, is keyed a heavy fly-wheel $u$. The arm $i$ of the ball $h$ is fixed to the latter in a position at right angles to the slanting arm $f$, while the center of the ball $l$ is arranged vertically under the ball $h$, so that the arm $k\ n$ will slant in the opposite direction to arm $i$.

The device operates in the following manner: On turning the crank $c$ the bevel $a$, and with it the arm $d$, will be revolved, taking with them the weighted arm $f\ g$, the force of revolution of which is transmitted, by means of the balls $h$ and $l$ and lever-arms $i\ k\ n$ and disks $p$, to the bevel $q$, thence to the bevel $r$ and pulley $s$. The heavy fly-wheel will equalize any unevenness in the running of the motor.

I claim as my invention—

In a motor the combination of an eccentrically-mounted weight, a ball $h$ about which said weight revolves and an arm $f$ to connect said ball and weight, a suitably-driven revolving pulley $p$, an arm $n$ mounted by means of a ball-joint eccentrically on said pulley, a ball $l$ and extension $k$ rigidly attached to said arm $n$, a machine-frame having suitable bearings for the said balls $h$ and $l$ and a lever $i$ fast on said ball $h$ and means for connecting said lever to the end of the arm $k$ substantially as described.

In witness whereof I hereunto set my hand in presence of two witnesses.

PAUL STARK.

Witnesses:
 GUSTAV GOEPEL,
 FRIEDRICH BÄSSLER.